UNITED STATES PATENT OFFICE.

WILLIAM EDWARD PRISK AND HORACE REID HARRISON, OF HALIFAX, NOVA SCOTIA, CANADA.

PURIFYING BARIUM SULFID.

1,256,593. Specification of Letters Patent. Patented Feb. 19, 1918.

No Drawing. Application filed May 31, 1917. Serial No. 171,870.

*To all whom it may concern:*

Be it known that we, WILLIAM E. PRISK and HORACE REID HARRISON, said PRISK a citizen of the United States, said HARRISON a subject of the King of Great Britain, both residing at Halifax, Province of Nova Scotia, and Dominion of Canada, have invented a new and useful Process of Purifying Barium Sulfid, of which the following is a specification.

This invention relates to a process of purifying barium salts, whereby their commercial value is largely increased.

Products formed from barium sulfid have been heretofore largely used in the manufacture of certain kinds of paints, as well as for other purposes. As previously prepared, these substances have contained more or less impurities which have discolored the material and have thus materially decreased the value of the product and limited its uses.

The principal object of our invention is to provide an improved process for purifying barium sulfid by first oxidizing and thereafter removing the impurities thereof, so that precipitates formed therefrom will have a clear white color, and will thus be available for use in the manufacture of white paint, as well as for other purposes.

In carrying out our improved process, we take a solution of barium sulfid, and first treat the solution with an insoluble metallic oxid. For this purpose we preferably use manganese dioxid, and we find it convenient to use this material in granulated form as a filter through which the solution is passed.

After the oxidizing agent has acted upon the barium solution to oxidize the impurities contained therein, we submit the solution to a second filtering process to remove the impurities. For this purpose we prefer to use a fixed carbonate such as calcium carbonate, and we find it desirable to use this material also in granulated form as a filter through which the solution is passed.

We sometimes find it desirable to extend this filtering process, by arranging the apparatus, so that the solution is passed alternately through a plurality of filters, containing manganese dioxid, and calcium carbonate, alternately, the solution being subject to the action first of one of these materials, and then of the other, and the process being continued until all of the impurities are removed. After the solution is thus purified, it may be used for the preparation of insoluble salts of barium, such as barium sulfate, and these salts may be used commercially as desired.

A common method of treating the purified solution is to mix it with a solution of zinc sulfate, the combined action causing barium sulfate and zinc sulfid to be precipitated as a white powder which is used in the manufacture of paint and for other purposes.

The described method of precipitating the salt and the uses to which it is thereafter put form no part of our invention.

Having thus described our invention, it will be evident that the process may be varied by those skilled in the art, without departing from the spirit and scope of our invention as set forth in the claims, and we do not wish to be otherwise limited to the details herein disclosed, but what we claim is:

1. The process of purifying barium sulfid, which consists in passing a solution thereof through a filtering device containing an insoluble oxidizing agent, having a metallic base, and thereafter passing the solution through a second filtering device containing a fixed carbonate, thereby removing the oxidized impurities.

2. The process of purifying barium sulfid which consists in treating a solution thereof with an insoluble metallic oxid to oxidize the impurities thereof and thereafter removing the oxidized impurities by filtration.

3. The process of purifying barium sulfid, which consists in passing a solution thereof through a filter of manganese dioxid and through a filter of fixed carbonate, successively.

4. The process of purifying barium sulfid, which consists in filtering a solution thereof through granulated manganese dioxid, and thereafter refiltering the solution through granulated calcium carbonate.

5. The process of purifying barium sulfid, which consists in passing a solution thereof through a plurality of filters containing manganese dioxid and calcium carbonate in alternate succession.

In testimony whereof we have hereunto affixed our signatures.

WILLIAM EDWARD PRISK.
HORACE REID HARRISON.